United States Patent Office  3,077,411
Patented Feb. 12, 1963

3,077,411
METHOD OF DEHYDRATING EGGS
William A. Mitchell, Lincoln Park, and Victor V. Studer, Sparta, N.J., assignors to General Foods Corporation, White Plains, N.Y., a corporation of Delaware
No Drawing. Filed Aug. 31, 1960, Ser. No. 53,041
5 Claims. (Cl. 99—210)

This invention relates to a new egg product. More particularly, it relates to a novel dehydrated egg characterized by its ability to hydrate to an edible product without further cooking.

As is well known to those skilled-in-the-art, eggs are consumed in large quantity by most consumers. It is also well known that whole eggs have a limited shelf life, typically less than about 14 days. Because of this limited shelf life and because of the desire of the consumer to purchase fresh eggs, considerable care has heretofore been taken to insure that eggs have been fresh at point of purchase.

The problems of maintaining eggs fresh for any extended period of time have resulted in the past in various attempts to treat eggs in order to attempt to extend their shelf life. Alhough techniques such as freezing or coating may have been employed, drying or dehydrating of eggs has most commonly been attempted. In the preparation of dried eggs, the eggs are shelled, homogenized, and spray dried. It is well known to those skilled-in-the-art that the drying of eggs in this manner or in any other manner heretofore employed, permits attainment of a dried product which is low in quality.

The so-prepared dehydrated eggs when mixed with water and recooked, do not produce a cooked egg product which more than superficially resembles the product prepared from fresh eggs. It is well known that the products prepared from dried eggs are generally unacceptable to the consumer in all respects, e.g. taste, appearance, consistency, etc. Dried eggs prepared in this manner have found no extensive use other than as a component of mixes such as cake mixes, wherein their undesirable features may be masked.

Dehydrated eggs which have heretofore been prepared have been directly prepared by drying of uncooked eggs as heretofore noted. It has generally been considered that it was not possible to obtain a desired ultimate dried product by drying of cooked eggs because it was felt that the fact that the eggs had been coagulated during cooking would interfere with subsequent rehydration. This conclusion appears to have been based on the fact that scrambled eggs, boiled eggs, fried eggs, or eggs cooked by other techniques apparently do not, under normal conditions, take up any substantial amount of water. Accordingly there has heretofore been no teaching of any technique of dehydrating a cooked egg composition to produce a product which was readily capable of being reconstituted by addition of water to form a desirable reconstituted egg product which was satisfactory to consumers.

It is an object of this invention to prepare a novel dehydrated egg product characterized by its ease of reconstitution and by its ability to form, on rehydration without cooking, a product which is substantially identical to the coresponding product formed from fresh eggs. It is another object of this invention to set forth a technique for making such a product. Other objects will be apparent to those skilled-in-the-art on inspection of the following description.

In accordance with certain of its aspects, the process of this invention for preparing dehydrated eggs comprises blending whole eggs, cooking said blended eggs, mixing said cooked blend eggs with water, drum drying said mixture, and removing flakes of dehydrated egg from said drum drying.

The eggs which may be employed in practice of this invention are preferably fresh, raw, whole eggs which may be less than 14 days old. Although it may be possible to obtain the process of this invention with fresh eggs which are greater than 14 days old, it is found that the product produced thereby is less superior; it may tend to have slight off-odor or flavor.

Preferably the raw, whole eggs are separated from their shells and blended or homogenized to insure a uniform mixture. Homegenazation or blending may be effected in desired equipment. In the laboratory or on a small scale operation, a Waring Blendor may be employed. In larger operations, it may be possible to employ, e.g. a Lightning Mixer. The homogenized egg mixture will commonly contain 24% solids and 76% water.

The homogenized egg may then be cooked. Preferably cooking may be effected by heating to a temperature of at least 67° C., typically 67° C. to 100° C. and preferably 80° C. During cooking, constant stirring should be effected. The heated egg coagulates during the period of e.g. 3 to 6 minutes, preferably 4 minutes which is required to complete cooking for e.g. a 1 kilogram batch.

The cooked egg may be diluted with about 20 to 140 parts of water to provide a product liquid having a water content of 80%–90%, preferably 87%. Although the added water may be at any desired temperature, it is preferred to use water at a temperature of 80–100° F., preferably 80° F. Use of water at higher temperatures facilitates carrying out of the subsequent steps. If desired, an enriched egg mixture may ultimately be obtained if milk or other desired fluid be employed in place of water.

The so-prepared mixture may be homogenized and dried. In the preferred embodiment, drying may be effected by use of a drum drier, preferably operated at atmospheric or lower pressure. In a typical drying operation conducted under vacuum of 29 inches of mercury, the drum dryer may operate with a drum separation of 0.003" and steam pressure within the drum may be maintained at 30 to 40 lbs. pressure, typically 40 lbs. gauge.

The so-prepared product is a light yellow color flake which may have a density of 0.08 gram per cc. The odor of this product is substantially nil; it may have a very slight odor resembling cooked eggs. This product may be stored for an extended period of time without development of non-bland, undesirable odors or taste.

The flakes of dehydrated egg may be readily reconstituted by mixing with water to form a product which, without further cooking, resembles cooked scrambled egg. 25 grams of the dried egg product may produce a volume of reconstituted product which approximates a helping of two whole eggs, this being effected by reconstituting the 25 grams of dried product with 80 ml. of boiling water. Preferably reconstitution may be effected by adding boiling water to the dried egg product. When this is done, the small flakes of dried eggs immediately expand and swell into pieces of egg which resemble cooked, scrambled egg. A very light stirring of the reconstituted mixture gives a product which is substantially indistinguishable from scrambled eggs prepared from fresh eggs. If desired, flavoring ingredients such as butter or salt may be added to the dried product before or after the addition of water. The so-reconstituted scrambled eggs were found to be the equivalent, in all respects, of cooked scrambled eggs prepared from fresh whole eggs. In comparative tests on numerous occasions, it was found that the consumer believed that scrambled eggs prepared from the dried eggs of this invention were the standard prepared from fresh eggs.

*Example*

In accordance with a specific example of this invention, raw whole eggs were shelled to give 100 parts per weight of egg. This raw, whole egg was blended by intimate mixing to give a substantially homogeneous mixture. The liquid mixture was heated by indirect heat exchange to 80° C. for 5 minutes, during which time cooking was effected. At the end of this time, the mixture, now containing coagulated cooked eggs, was mixed with 80 parts of water at 80° C.

The so-blended homogeneous liquid was drum dried by passsing onto a drum drier having a 0.003" drum separation. Steam pressure in the drums was 40 p.s.i.g., and pressure around the drums was 28 inches of mercury. The dried material which was removed was a flaked product having a clean yellow color and a slight egg aroma. The bulk density was about 0.08 gram per cc.

To 25 grams of this dried egg product were added 80 ml. of boiling water. Within 10–15 seconds the product had rehydrated. The mixture was mixed for a short time with a fork. The product was immediately ready for eating. It possessed all of the properties of scrambled eggs and it was fully equivalent thereto with respect to taste, appearance, texture, etc.

It will be apparent to those skilled in the art that although this invention has been described in terms of a specific example, that various modifications may be made thereto which fall within the scope of the following claims.

What is claimed is:

1. A method of preparing a dehydrated egg which comprises removing the shells of whole eggs, blending said whole eggs, cooking said blended eggs at a temperature of 67° to 100° C. for a period of time sufficient to coagulate said blended eggs while constantly stirring said blended eggs, mixing 100 parts of said cooked blended eggs with 20 to 140 parts water, drum drying said mixture, and removing flakes of dehydrated egg from said drum drying.

2. A method of preparing a dehydrated egg which comprises removing the shells of whole eggs, blending said whole eggs, cooking said blended eggs at a temperature of 67° to 100° C., for a period of time sufficient to coagulate said blended eggs while constantly stirring said blended eggs, mixing 100 parts of said cooked blended eggs with 20 to 140 parts of water thereby forming a mixture having a water content of 80%–90%, drum drying said mixture, and removing flakes of dehydrated egg from said drum drying.

3. The method of preparing a dehydrated egg as claimed in claim 2 wherein said water is at temperature of 80° C.–100° C.

4. A method of preparing a dehydrated egg which comprises removing the shells of whole eggs blending said whole eggs, cooking said blended eggs at a temperature of 67° to 100° C. for a period of time sufficient to coagulate said blended eggs while constantly stirring said blend, mixing 100 parts of said cooked blended eggs with 20 to 140 parts water, drum drying said mixture at a temperature corresponding to a steam pressure with the drums of 30–40 p.s.i.g., and removing flakes of dehydrated egg from said drum drying.

5. The method of preparing a dehydrated egg as claimed in claim 4 wherein the drum drying is effected on a double drum drier having a drum clearance of about 0.003 inch.

References Cited in the file of this patent

UNITED STATES PATENTS

| | | |
|---|---|---|
| 233,750 | Halvorson | Oct. 26, 1880 |
| 762,277 | Campbell | June 14, 1904 |
| 1,100,973 | Hara | June 23, 1914 |
| 1,818,212 | Epstein et al. | Aug. 11, 1931 |
| 1,891,887 | Clickner | Dec. 20, 1932 |